(12) United States Patent
Schilling et al.

(10) Patent No.: US 6,562,233 B1
(45) Date of Patent: May 13, 2003

(54) STORM DRAIN LINE WITH RISER 2

(75) Inventors: Michael R. Schilling, Clinton, LA (US); Daniel P. Corn, Philip Ranch, CA (US)

(73) Assignee: PacTec, Inc., Clinton, LA (US)

( * ) Notice: Subject to any disclaimer, the term of this patent is extended or adjusted under 35 U.S.C. 154(b) by 0 days.

(21) Appl. No.: 10/034,957

(22) Filed: Dec. 27, 2001

Related U.S. Application Data (63) Continuation-in-part of application No. 09/982,695, filed on Oct. 18, 2001, which is a continuation of application No. 09/608,799, filed on Jun. 30, 2000, now Pat. No. 6,306,293, which is a continuation of application No. 09/191,358, filed on Nov. 13, 1998, now Pat. No. 6,086,758.

(51) Int. Cl.[7] .............................. E03F 5/06; E03F 5/042; B01D 29/27
(52) U.S. Cl. ...................... 210/164; 210/232; 210/484; 210/485; 210/489; 404/4
(58) Field of Search ................................ 210/163, 164, 210/165, 232, 170, 484, 485, 489, 908; 404/4

(56) References Cited

U.S. PATENT DOCUMENTS

| | | | |
|---|---|---|---|
| 809,201 A | * 1/1906 | Lutz ........................... 210/314 |
| 1,310,055 A | * 7/1919 | Caldwell ..................... 210/164 |
| 2,384,057 A | * 9/1945 | Wetherell .................... 210/489 |
| 2,552,894 A | * 5/1951 | Kiefer .............................. 4/652 |
| 2,928,419 A | * 3/1960 | Kruse .......................... 210/163 |
| 3,713,539 A | * 1/1973 | Thompson et al. .......... 210/164 |
| 3,960,733 A | * 6/1976 | Van Dieren .................. 210/460 |
| 4,261,823 A | * 4/1981 | Gallagher et al. ........... 210/164 |
| 4,273,466 A | * 6/1981 | Trahan et al. ................... 404/4 |
| 4,419,232 A | * 12/1983 | Arntyr et al. ................ 210/164 |
| 5,037,541 A | * 8/1991 | Ruey-Jang et al. .......... 210/141 |
| 5,095,667 A | * 3/1992 | Ryan et al. ...................... 52/20 |
| 5,985,157 A | * 11/1999 | Leckner et al. ............. 210/747 |
| 6,086,758 A | * 7/2000 | Schilling et al. ............ 210/164 |
| 6,241,882 B1 | * 6/2001 | Allard ......................... 210/162 |
| 6,306,293 B1 | * 10/2001 | Schilling et al. ............ 210/164 |

FOREIGN PATENT DOCUMENTS

JP          11-210070     *  8/1999

* cited by examiner

*Primary Examiner*—Fred Prince
(74) *Attorney, Agent, or Firm*—Jones, Walker, Waechter, Poitevent, Carrere & Denegre, L.L.P.

(57) ABSTRACT

A drain filtering system is disclosed, having a filter placed within a basket which is suspended from frame positioned underneath a drain grate atop the inlet to a storm drain. The filter is constructed from materials that filter out heavy metals, sediments, debris and hydrocarbons from the water passing through. The system includes a riser tube having an inlet and an outlet, where the inlet is positioned inside the filer, and the outlet is positioned external to the filter. The inlet is placed close to the top of the filter to allow a bypass fluid path for periods of high flow.

19 Claims, 7 Drawing Sheets

STORM DRAIN LINE WITH RISER 2

This application is a continuation-in-part of application Ser. No. 09/982,695, filed on Oct. 18, 2001, which was a continuation of application Ser. No. 09/608,799, which was filed on Jun. 30, 2000, now U.S. Pat. No. 6,306,293, which was a continuation of application Ser. No. 09/191,358, filed Nov. 13, 1998, now U.S. Pat. No. 6,086,758.

BACKGROUND OF THE INVENTION

1. Field of the Invention

This invention relates to filtering systems, more particularly filtering systems used in storm drains.

2. Prior Art

Stormwater flows into storm drains, often located on or near a street or highway, and into under ground lines. A problem associated with stormwater run-off is contamination with heavy metals and hydrocarbons that have leaked onto the streets and highways from a variety of sources. Sediment contained in the stormwater run-off also creates problems. Many times the contamination is so high that the storm water discharge exceeds the pollution limits imposed by federal and state laws. Thus, a need exists for a water-filtering device that can filter out heavy metal and hydrocarbon contaminants.

Prior attempts have been made to design filtering systems placed below the surface of the drain within the drain basins. For example, U.S. Pat. No. 4,419,232 to Arntyr, et al discloses a two-tier system whereby a coarse material filter is placed above a finer filtering material. Arntyr, et al discloses that the filter bag disclosed therein is capable of filtering out oil and other viscous impurities from the drain water, but only to a certain extent. As noted by Arntyr, et al, the coarse filtering stage is necessary to prevent the filtering bag from breaking when filled with sticks, rocks, and other debris. U.S. Pat. Nos. 5,372,714 and 5,525,925 to Logue disclose the use of a subsurface filtering system whereby the filter is supported by a series of flaps which are sandwiched between the drain grating and a recess in the catch basin. The problems associated with this device are that the bag is susceptible to breaking for lack of support from below and that the flaps can become dislodged from between the basin recess and drain grating thereby causing the system to become inoperable. A further problem associated with the Logue device is the use of a woven polypropylene material. The woven material and lack of overflow outlets restrict the maximum flow rate through the system to about 40 gallons per minute per square foot and causes water flow to back up during heavy downpours, resulting in flooding around the drain. The use of a woven material also prevents the material from effectively filtering out the heavy metals and hydrocarbons. Thus, a need exists for a filter with increased flow capacity and the ability to filter out heavy metals and hydrocarbons.

One attempt to create a better storm drain liner is shown in applicant's prior patents, U.S. Pat. No. 6,0867,583 and its continuation, hereby incorporated by reference. These devices generally show a basket with a bag liner place therein. The basket is attached to a frame and the frame is positioned in the inlet or can be attached to the storm drain. These patents also show one or more overflow flaps positioned in the bag liner near the top opening. The overflow flap is designed to allow excess incoming water to bypass the filter during periods of very heavy flow, that is, when the flow into the storm drain exceeds the filter's throughput. The bypass flap allows fluids to enter the filter system but exit the system without passing through the filter medium: water flows between the sidewalls and the exterior of the filter to reach the outlet of the storm drain. Without the bypass flaps, the filter system could back up during periods of heavy flows.

The bypass flaps, however, can be ineffective. In periods of heavy flow when the bypass would be needed, the basket/filter below the bypass is fluid filled. These fluids generate outward pressures that can force the basket and filter into close engagement with the sidewalls of the storm drain. If this occurs, the bypass will be ineffectual, as the fluid flow path between the sidewalls of the drain and the exterior of the basket would be severely restricted or eliminated.

OBJECTS OF THE INVENTION

With the aforementioned considerations in mind, it is therefore an object of this invention to provide a single filtering system that is adaptable to all existing storm drains and has an effective by-pass means even when the basket/filter seals against the sidewalls of the storm drain.

SUMMARY OF THE INVENTION

An apparatus for a storm drain filter in a storm drain having an inlet and an outlet which comprises a basket positioned between said inlet and said outlet and a water-permeable filter positioned at least partially within said basket, the basket is attached to a frame for placement in the storm drain. Positioned in the basket is a riser tube, having an open top and open bottom. The open bottom penetrates the bottom of the basket.

DETAILED DESCRIPTION OF PREFERRED EMBODIMENTS OF THE INVENTION

Figure 1:
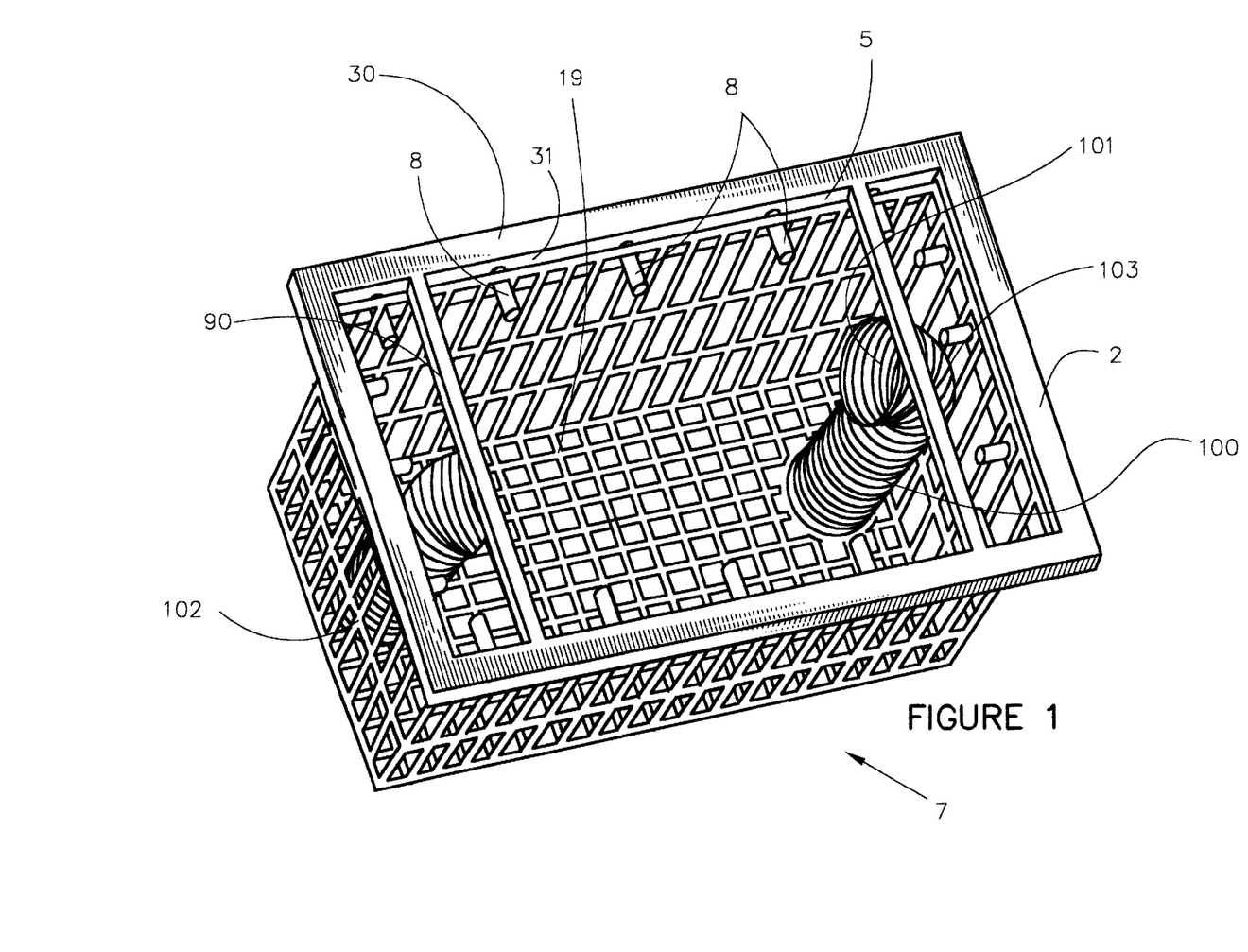
FIG. 1 is a perspective view of the drain filter apparatus without the filter bag.
Figure 2:
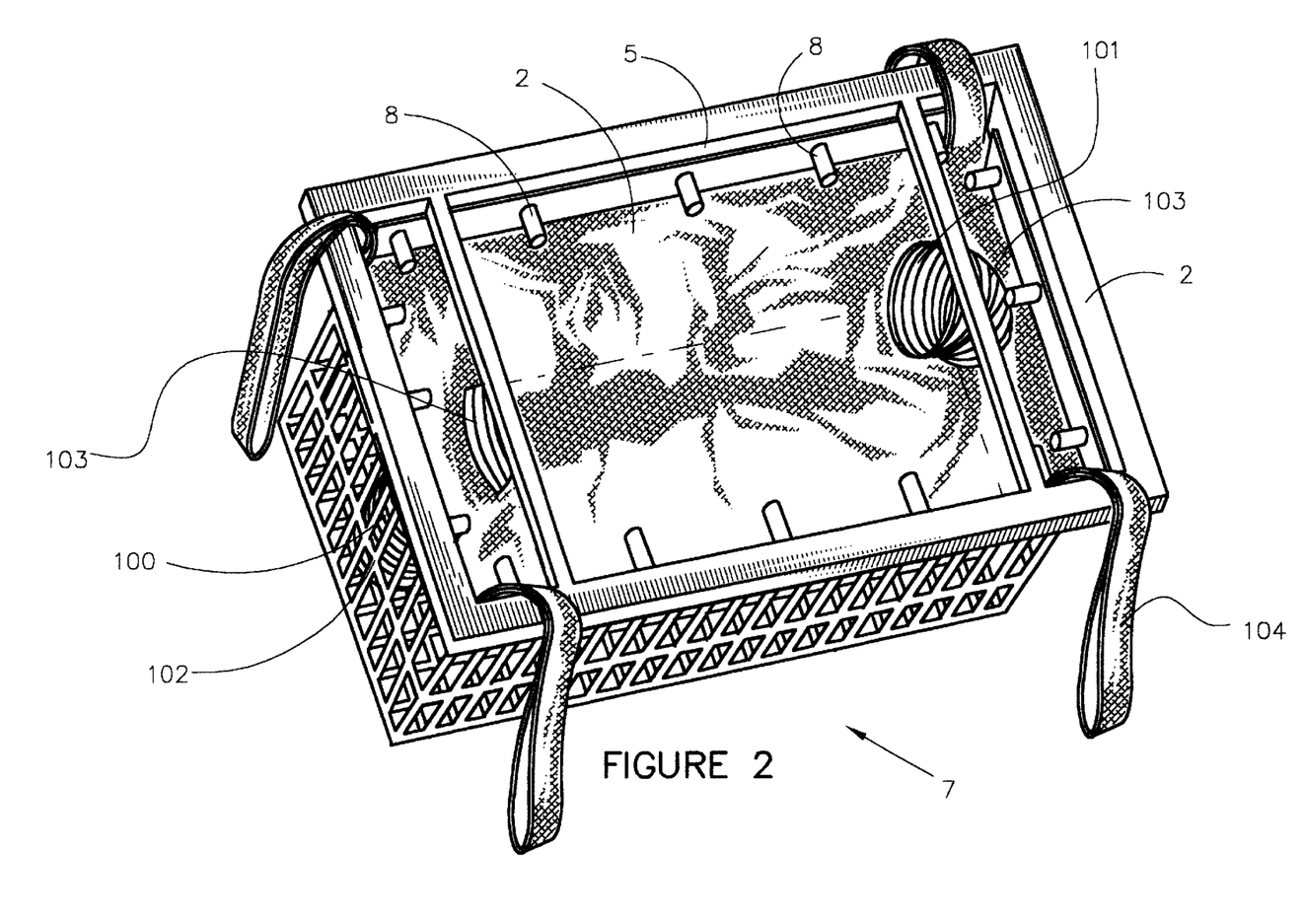
FIG. 2 is a perspective view of the drain filter apparatus, including the filter.
Figure 3:
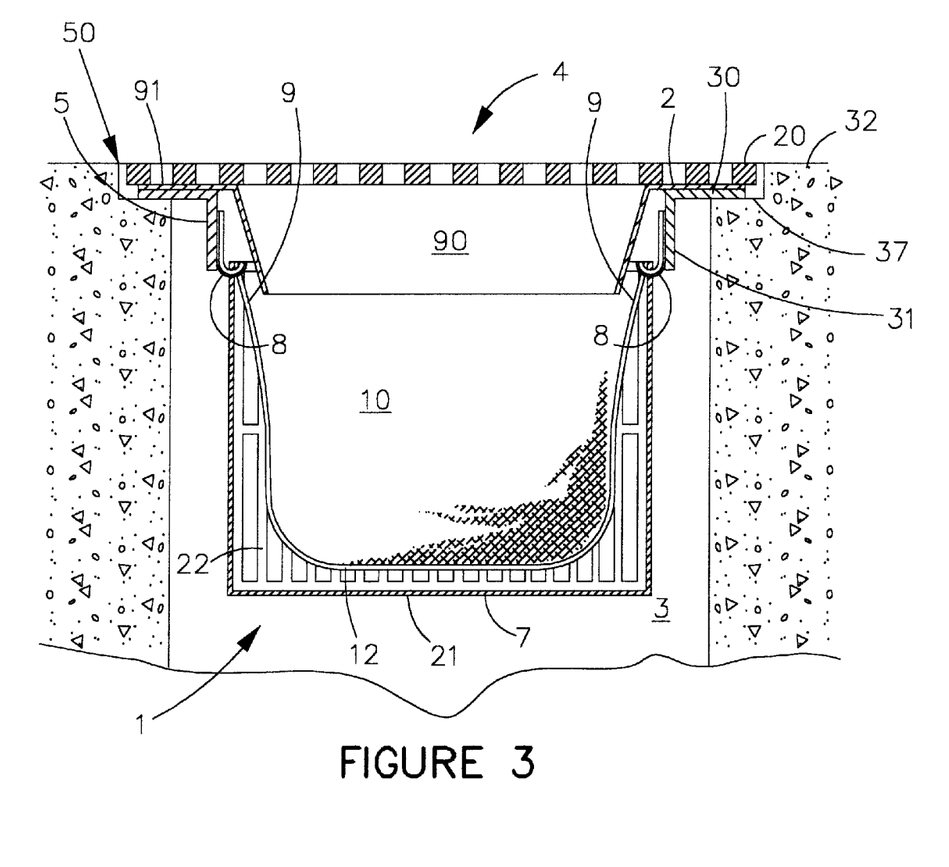
FIG. 3 is a cross-section through one embodiment of the apparatus.

As shown in FIGS. 1–3, one embodiment of the drain filter system 1 comprises, generally, of basket 7 having an open top 19 with a grated bottom 21 and grated side walls 22. Basket 7 is positionable within drain 4 between inlet 50 and an outlet (not shown), or in the inlet. As used herein, inlet 50 is the area where liquid first flows into drain 4 from ground level 32. Inlet can be a vertical opening into the drain or a side opening into the storm drain. A filter 10 is positionable is least partially within basket 7 so that substantially all water passing through inlet 50 flows through filter 10 during periods of normal flow. In FIG. 2, the filter 10 is shown installed in the embodiment of FIG. 12. It is preferred that drain filter system 1 be positioned so that the basket is raised off the drain bottom and the outlet.

Drain filter system 1 comprises a frame 2 positionable within drain 4. Most top inlet drains 4 have a recess 37 below ground level 32 where a drain grate 20 rests, or a side opening (as in many street drains) into the storm drain cavity. Drain grate 20, if present, prevents large objects from falling into drain 4. Frame 2 may have sides 5 that are expandable (see FIG. 6) so that system 1 can be easily positioned in nearly all existing drains 4. For use in top opening drains, sides 5 can be flanged members having a vertical wall 31 and a flange 30. Flange 30 rests atop recess 37 below drain grate 20 allowing vertical wall 31 to extend downward into basin 3. A plurality of attachment means, such as hooks or pins 8 attach to sides 5 along vertical wall 31 and are engageable with basket 7 to suspend basket 7 from frame 2 within drain 4. Attachment means shown in FIG. 1 are pins 8, while in FIG. 3 are shown as J-shaped hooks. Frame 2 and its components are preferably constructed of corrosion-resistant material such as stainless steel. Other types of hooks or pins could be used to suspend the basket from the frame.

Figure 4A:
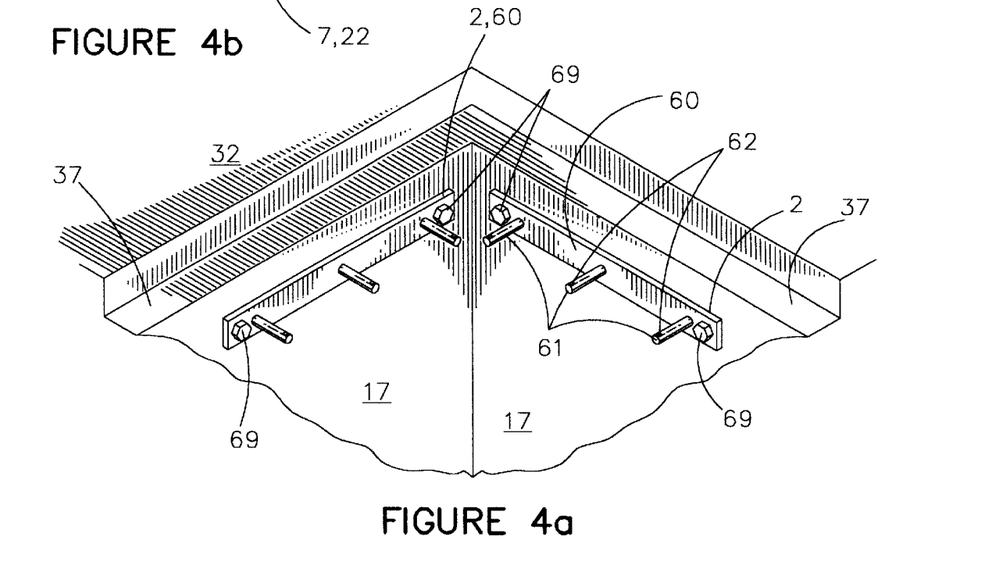
FIG. 4 is a perspective view of a portion of the system attached to a storm drain.
Figure 4B:
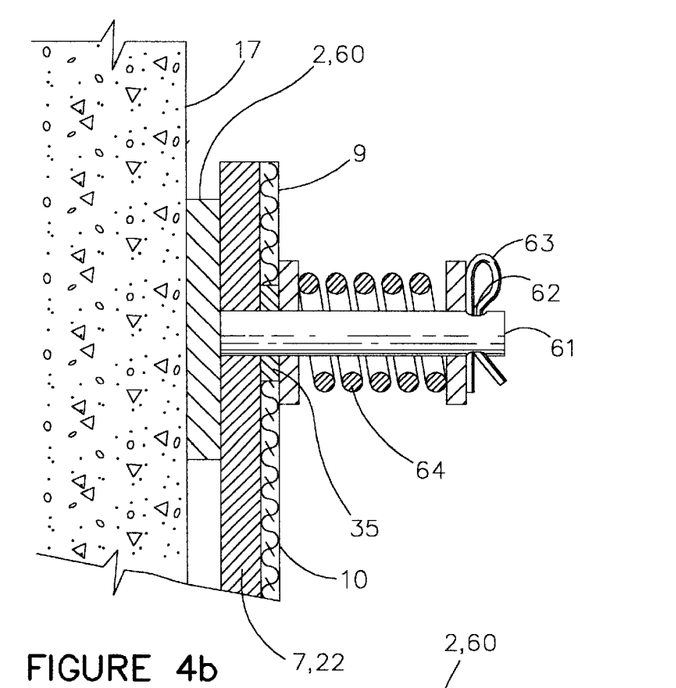

In one embodiment, shown in FIG. 4a, frame 2 comprises a series of plates 60 which are attachable to drain side walls 17 using any conventional mean known for attaching objects to concrete walls, including bolts 69, pins and the like. Each plate 60 is constructed to have one or more pins 61 fixedly attached thereto and extending therefrom. Each pin 61 is constructed to have an aperture 62 therein at the end of pin 61 opposite plate 60, shown in FIG. 4b. Plates 60 are preferably constructed from a rigid, corrosion-resistant material, such as stainless steel. Plates 60 are manufactured to fit into a particular drain 4 or are manufactured in 6 to 8 foot lengths and cut on-site. Each plate 60 has a series of apertures 66 therein which allow plate 60 to attach to sidewalls 17. Once plates 60 are attached to sidewalls 17, the remainder of system 1 can be installed, as shown in FIG. 4c.

Alternatively, frame 2 could include a square or rectangular frame member with chains or cables attached to the frame member, with the resulting frame hung or suspended from the drain system by suitably attaching the cables to the drain system, with an attachment means, such as by bolt attachment or hook attachment to a suitable portion on the drain system. When the frame 2 is suspended from the drain system, it is preferred that the attachment means be fixedly attached to the drain system (such as by bolting the chains into the drain system) to prevent the suspended filter system from being easily removed or stolen from the drain system.

Figure 4C:
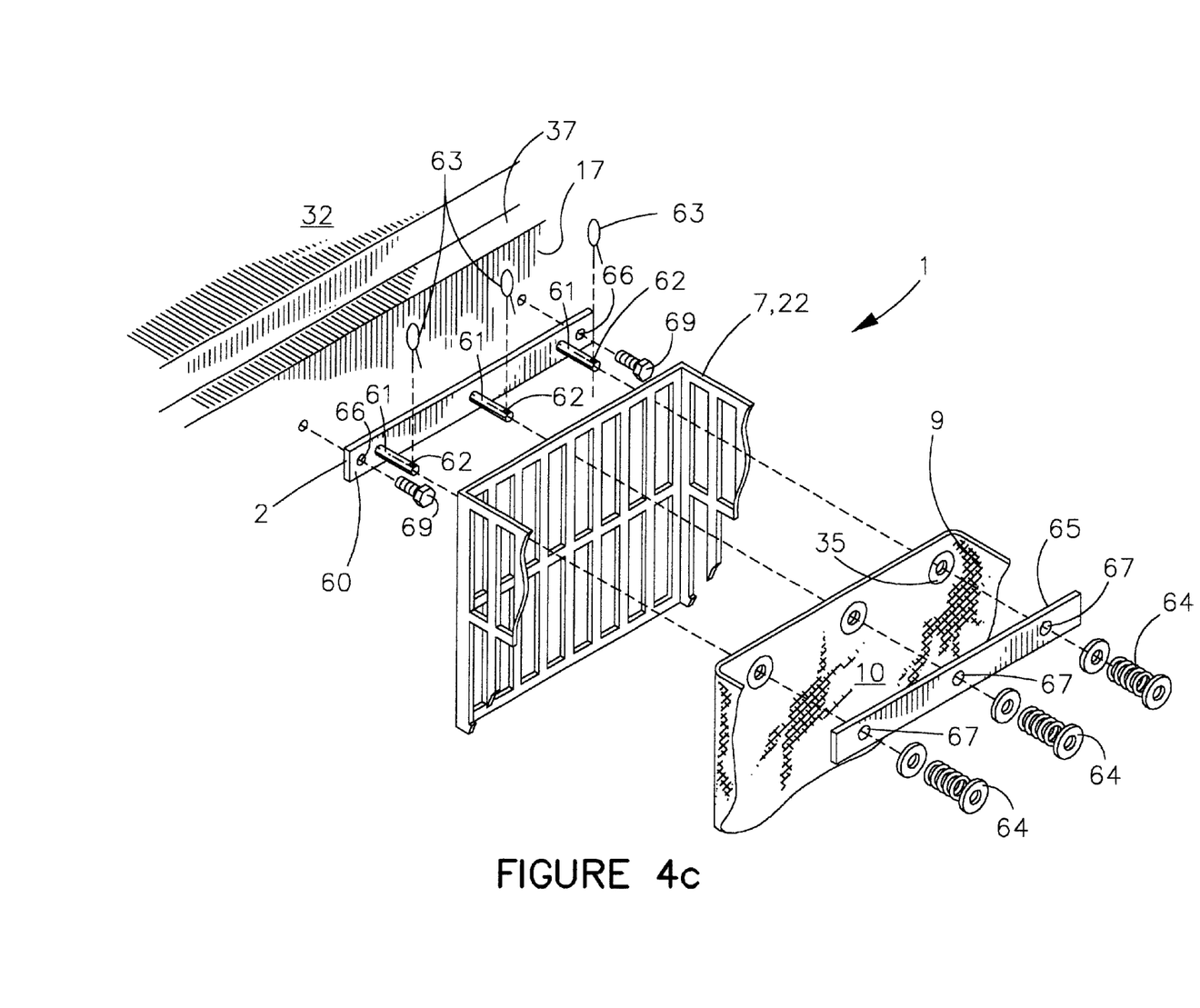

As shown in FIG. 4c, basket 7 is inserted into drain 4. Pins 61 slide through grated side walls 22 so that basket 7 is suspended from pins 61. Filter 10 is positioned at least partially within basket 7 and rings 35 slide over pins 61 so that filter 10 is supported from above by pins 61 and from the sides and below by basket 7. Plate 65 slides over pins 61 by passing pins 61 through apertures 67 so that filter 10 and basket 7 are sandwiched between plate 60 and plate 65. To hold filter 10 and basket 7 securely on pins 61 so that substantially all water entering drain 4 passes through filter 10, a locking member 64, such as a spring-loaded washer or a pair of washers surround a spring, slides over pins 61 and is compressed past aperture 62. Locking pin 63, which can be a cotter key other means for holding locking member 64 in place, is inserted through aperture 62 so that locking member 64 does not disengage pin 61. Plate 65 insures that uniform pressure is exerted against filter 10 along upper edge 9. In turn, this forces substantially all of the water entering drain 4 through filter 10, with little or no water passing between side wall 17 and filter 10. This embodiment may also incorporate a funnel 90 positioned similar to that previously described.

Figure 5:
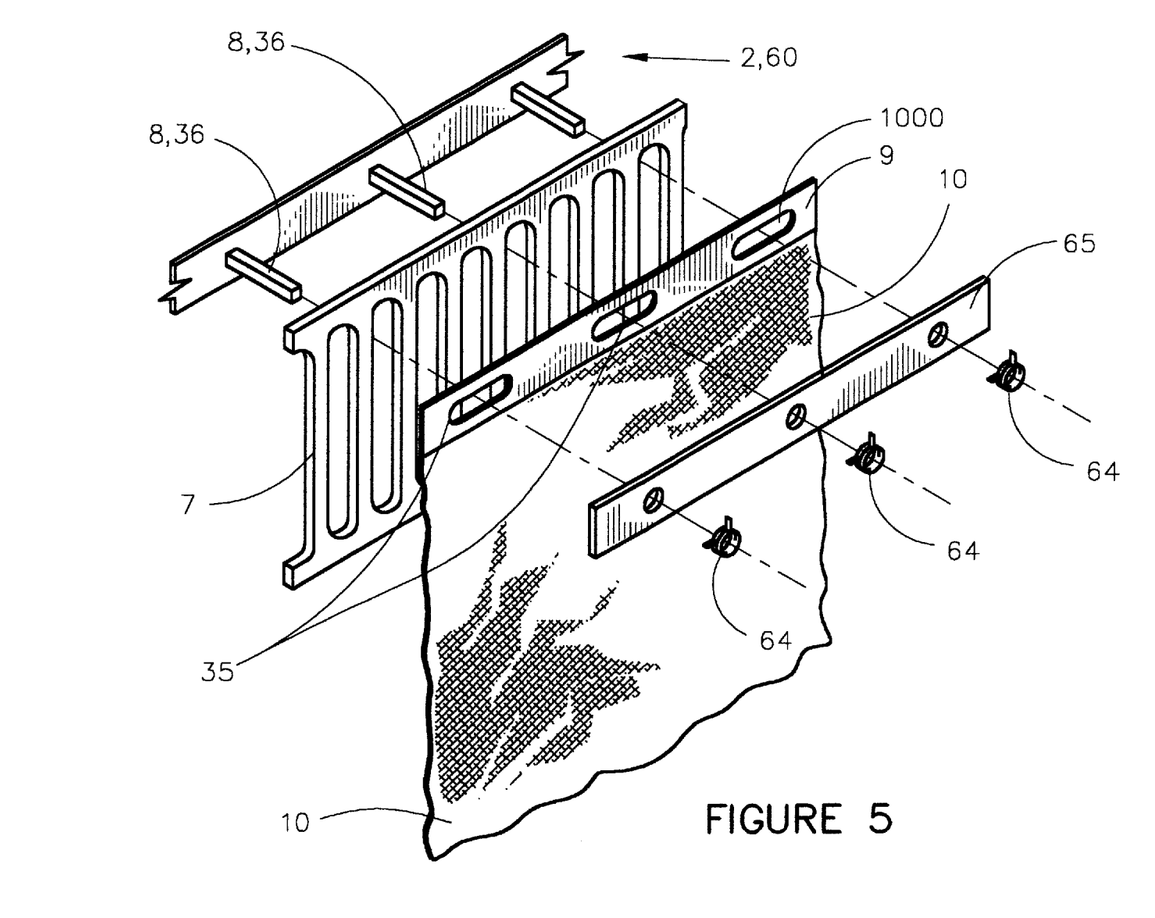
FIG. 5 is a perspective view of the retention plate holding the filter to the frame.

An alternative means of attaching the filter to the frame is shown in FIG. 5. Shown is frame 2 that is composed of a series of plates 60 to be mounted into the wall or other location in a storm drain. Pins 8 protrude from the plates. The basket 7 is slid over and supported by the pins. The filter 10 now has a semi-rigid or rigid retention plate 98, which has holes therethrough for sliding over pins 8. Retention plate 98 as shown is constructed from ¼ inch PVC plate. Other suitable rigid plastic or metal could be used. Filter 10 may be sewn to the retention plate 98, or filer 10 may have pockets into which retention plate is inserted (not shown). Retention plate 98 with filter is then place over pins, and a retaining means 99 used to hold retention plate onto pins 8 and frame 7. As shown, retaining means is as simple pipe clamp. As an alternative, a second retention plate can be used to couple the filter/first retention plate to the frame, as shown in FIG. 5. In this fashion, the second retention plate is specifically fashioned for the particular frame 2, and the replaceable filter with the first retention plate can incorporate oblong openings 1000, enabling the filter to be adaptable to variations in pin placement on the frame. The use of retention plate(s) eliminates the need to install grommets 35 in the filter (shown in FIG. 4c).

Referring back to FIGS. 1–3, basket 7 is constructed from a corrosion-resistant material, preferably high-density polyethylene, which can support upwards of 5,200 pounds per square foot and should be grated to allow large amounts of water to pass therethrough. This material may be flexible or rigid as long as it can withstand the required forces. A preferred material for basket 7 is TENSAR Structural Geogrid No. UX1600SB, available from Tensar Earth Technologies, Inc. of Atlanta, Ga. On method of constructing the basket is to have the basket made from a single piece of material. For instance, the basket can be built as a flexible sling from a single piece of material, having two sidewalls and a bottom. Alternatively, the basket could be constructed starting with a single flexible rectangular rectangle of material, and notch out the four corners of the rectangle. The resultant material would then be folded into a box configuration (generally without a top) for attachment to the frame.

Basket 7 is positioned within drain 4 and attached to frame 2 to suspended basket 7 below frame 2 on J-shaped hooks 8, or other type of hooks, alternatively, basket could be wrapped about the frame. Basket sidewalls 22 are aligned so that hooks 8 pass through grated side walls 22 near open top 19. Basket 7 provides support to filter 10 from underneath and keeps filter 10 from breaking after prolonged use or after filter 10 fills with debris. As used herein, "basket" may also include any means of support for filter 10 to prevent filter 10 from bursting and to support filter 10 from below.

Also show within the basket is riser tube 100. As shown, riser tube 100 is a cylindrical tube having a top opening 101 and a bottom opening 102. One current embodiment has the riser tube 100 constructed of 3 or 4 inch corrugated flexible plastic drainpipe. The riser tube 100 has an offset section 103, shown as a 90 degree bend in the riser tube near the top end 101 of the riser tube 100. The 90-degree bend is present to ensure that water enters the riser tube 100 only in a bypass mode. For instance, in an open grated top storm drain system, the 90 degree bend ensures that water flowing into the open grate will not drop into the riser tube's open top 101; water enters the riser tube top opening 101 only when water levels in the filter system "backs up" and reaches the riser top opening 101. Similarly, in a side opening storm drain system, the offset section could be a bend or angled section which would face away from the storm drain side inlet, again insuring that water only enters the riser top opening 101 when water levels in the filter back up and reach the riser top opening level. The offset section is designed so that the top opening of the riser tube does not open into, or have a component that faces the storm drain opening. In a side opening system, a vertical riser tube top opening would not face the side opening, but with sufficient flow, the top opening could still have water pouring into the top opening from the side inlet. In general, the offset section will be a bend or angled section, or a raised cover facing the inlet (somewhat like that installed on chimneys) all considered a means to prevent flows into the riser tube top opening in periods of heavy flows. When the riser tube 100 is substantially positioned on the exterior of the basket, the offset section could be used so that the top riser opening 101 opens into the interior of the filter system. The offset section can, however, be dispensed with.

As shown in FIG. 1, the riser tube 100 is place inside the basket, so that the top opening 101 will draw from the interior section of the filter bag. The riser tube 100 is preferably located close to the basket sidewalls, to enable the riser tube 100 to be secured to the basket sidewalls, such as with cable ties, and keeps the riser tube from flopping about. The open bottom end 102 of the riser tube 100 (the riser outlet) is adjacent to the grated bottom of the basket. In one embodiment, the open bottom end 102 of the riser tube is inserted through a matching opening in the basket bottom, as shown in FIG. 1. In an alternative embodiment, the riser tube end is simply secured adjacent to the basket, without penetrating the basket bottom. Hence, the riser tube 100 presents a flow path opening from the interior of the basket and filter, and exits on the exterior side of the filter.

The riser tube may exit or penetrate the basket.

Another alternative embodiment is to have the riser tube 100 positioned, in part, external to the basket. For instance, the riser tube 100 may exit out of the top of the basket, and down the external sidewalls of the basket, to open near or below the bottom of the basket. The top open end of the riser tube will generally have a 90-degree bend to allow the riser tube 100 to penetrate the basket near the basket top. In this embodiment, the filter material will have an opening near the top of the basket to accommodate the riser tube 100 entering the interior of the filter system (or the riser tube enters the basket interior above the filter). In other externally placed riser tube configurations, the riser tube 100 might not penetrate the basket, but instead be adapted to extend through the frame or basket support, and open above the basket or frame support. With external riser tubes, it maybe be desirable for the riser tube to be a rectangular shaped tube to minimize the deformation of the basket when pressed around the riser tube 100. Note more than one riser tube may be needed for particular applications.

Filter 10 is positioned at least partially within basket 7, but preferably filter bottom 12 rests on basket bottom 21. Filter 10 is constructed to have an open top 11, a closed bottom 12, and sidewalls 13 extending between top 11 and bottom 12. As shown in FIG. 2, filter also has grab loops 101 to help assist removal of the filter from the basket. Filter 10 also may have an opening to accommodate the riser tube when the riser tube top opening penetrates the basket in a filterable area. The filter is generally inserted into the basket over the riser tube. The filter generally thus has a matching opening to accommodate the riser tube, such as at the bottom of the filter, or near the top of the filter, as shown in FIG. 2. When the riser tub 100 is placed adjacent to the sidewalls, the filter may simply be inserted so that the riser tube is behind the filter, with the top opening of the riser tube either above the filter, or penetrating the filter somewhere along the riser tube length to access the filter interior, as shown in FIG. 2, where filter penetration is near the top of the filter element.

Referring back to FIG. 5, filter 10 is supported from above by frame 2 but could attach to basket sidewalls 22 (not shown). The upper edges 9 of filter 10 wraps over and around frame 2 to ensure that no water entering the system can flow through drain 4 without contacting at least a portion of filter 10, when not in by-pass mode. Filter 10 attaches to frame 2, as best seen in FIG. 5, using interlocking male 36 and female 35 members that are correspondingly positioned on upper edge 9 and frame 2. Interlocking male member 36, shown as a rod, attaches to hooks 8 on frame 2 and extends from hook 8. Interlocking female members 35, shown as rings, are positioned within and along upper edge 9. Upper edge 9 is reinforced to prevent rings 35 from tearing away from filter 10. Rings 35 fit over rods 36 and hold filter 10 in place. In other embodiments, other interlocking male 36 and female 35 members may be used and would include snaps, clips, and other fasteners known in the art for fastening or attaching two objects.

In another embodiment, frame 2 and basket 7 can be combined into a single basket member (not shown). Filter 10 attaches to basket member as in the previous embodiments. Basket member is constructed from a metal (such as stainless steel), a strong polymer, or other material that is corrosion-resistant and able to withstand the forces that a full filter 10 would exert on basket member. Riser tube 100 can be internally mounted or externally mounted with respect to the basket, as previously discussed.

Figure 6:
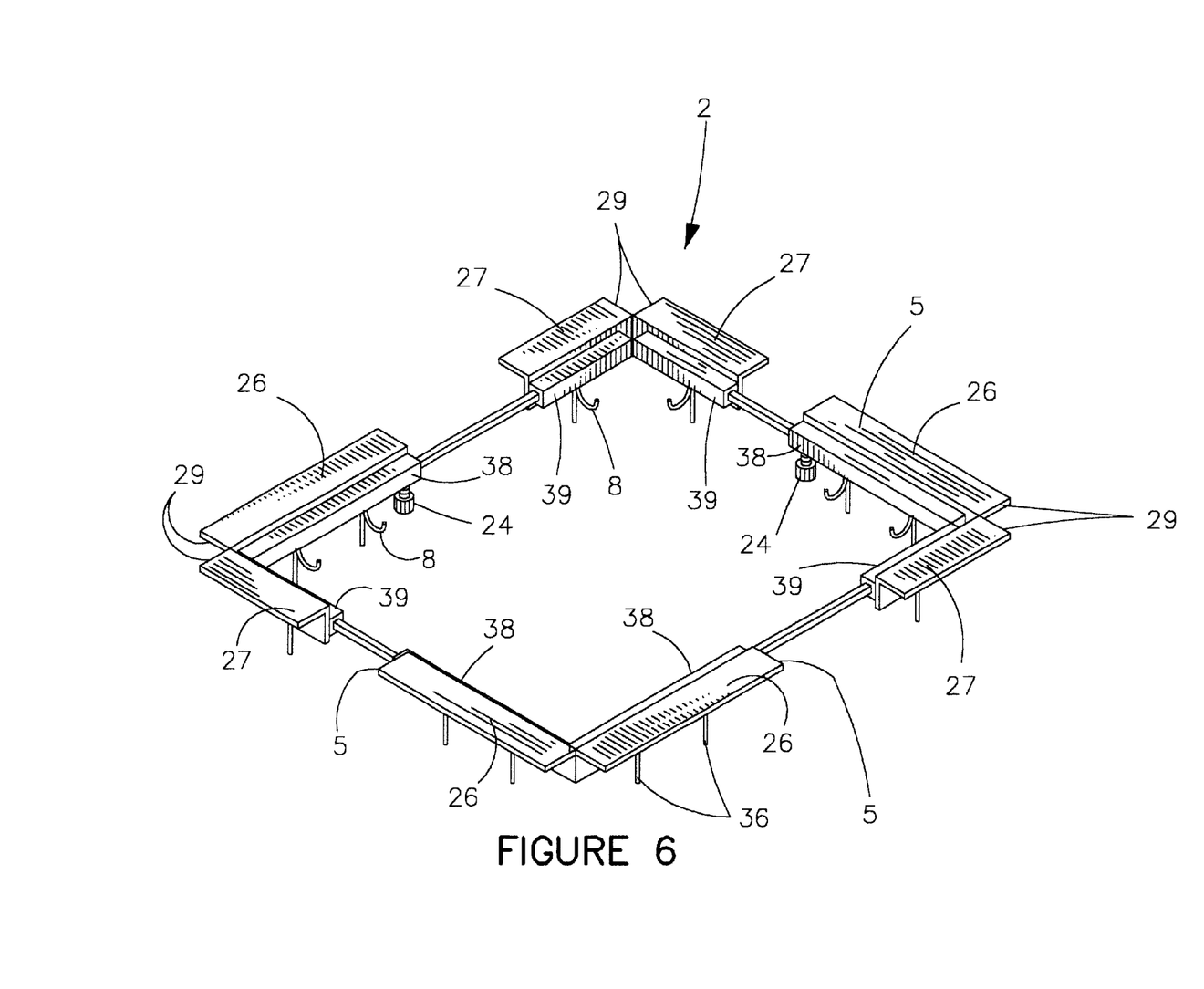
FIG. 6 is a perspective view of an expandable frame.

For the expandable frame shown in FIG. 6, each side 5 is constructed from a pair of flanged members 26, 27. Telescoping members 38, 39 attach to or are incorporated in flanged members 26, 27 so that the total length of each side 5 is adjustable to fit different sized drains 4. In other embodiments not shown, each side 5 can use a variety of means known in the art so that sides 5 are expandable.

A screw lock 24, or other locking means, is positioned on telescoping members 38, 39 to prevent flanged members 26, 27 from moving relative to one another. The ends 29 of each side 5 is are preferably welded to each other, but could be connected using other means well known in the art. In a square or rectangular shaped embodiment, each of the four sides 5 is expandable In the embodiment shown in FIG. 3, basket 7 is suspended on hooks 8, and filter 10 is placed within basket 7. Rings 35 are positioned over hooks 8 so that filter 10 is suspended by hooks 8 and extends into basket 7. A funnel 90, having a flanged upper end 91 is positioned atop frame 2 so that funnel 90 is supported atop frame 2 (and hence recess 37) and below drain grate 20. Funnel 90 is configured so that substantially all liquid entering drain 4 is directed into filter 10. Funnel 90 is constructed from a non-corrosive material, preferably high-density polyethylene. Again, the riser tube can be internal or external.

Filter 10 is preferably constructed from a water-permeable, non-woven polypropylene material, preferably weighing 3–16 ounces per square yard which can be obtained from Synthetic Industries or Carthage Mills, both of South Carolina. Polypropylene was chosen for its oleophilic ability to filter out heavy metals and hydrocarbons in the water to a non-detectable level, i.e., a level of less than about one part contaminant per million parts storm water (1 ppm), although in some installations higher limits, such as about 2 ppm are allowable. Other materials that promote the increased flow rates and are able to filter out heavy metals and hydrocarbons to non-detectable levels are also acceptable.

Water flows through the drain grate 20 or side opening and into basin 3 where it then flows through filter 10. Both solids, including small sticks, leaves, and dirt, as well as contaminants, including heavy metals and hydrocarbons are filtered out. Because expansion of filter 10 is restricted by basket 7, filter 10 cannot expand and break. At intervals chosen by the user, filter 10 can be emptied or replaced by removing drain grating 20 and lifting filter 10 from basket 7 or by vacuuming filter 10.

Although the preferred embodiment has been described, it will be appreciated by those skilled in the art to which the present invention pertains that modifications, changes, and improvements may be made without departing from the spirit of the invention defined by the claims.

We claim:

1. A drain filter apparatus for use in a storm drain, said apparatus comprising:
   a. a basket, a water-permeable filter positioned at least partially within said basket, said filter including a bag having an open top;
   b. a bottom and sidewalls extending between said top and said bottom, said bag having an interior and an exterior;
   c. a frame, said basket being attached to said frame; and
   d. a riser tube, said riser tube positioned in part in said basket and having an open riser top and an open riser bottom, defining a fluid conduit therebetween, said open riser top opening into the interior of said basket, said open riser bottom positioned exterior of said bag.

2. The apparatus according to claim 1 wherein said basket has an open top, a grated bottom and at least one grated sidewall.

3. The apparatus according to claim 1 wherein said filter is constructed from a non-woven or woven material.

4. The apparatus according to claim 1 further comprising at least one male interlocking member and at least one corresponding female interlocking member, wherein said filter is attachable to said frame using said male and female interlocking members.

5. The apparatus according to claim 1 wherein said filter is constructed from polypropylene.

6. The apparatus according to claim 1 further comprising a funnel, said funnel positioned to direct fluid into said filter.

7. A drain filter apparatus for use in a storm drain, said apparatus comprising:
   a. a basket;
   b. a water-permeable filter positioned at least partially within said basket, said filter including a bag having an open top, a bottom and sidewalls extending between said top and said bottom, said bag defining an interior and an exterior;
   c. a frame, said basket being attached to said frame; and
   d. a riser tube, said riser tube having a first and a second opening and defining a fluid conduit therebetween, said riser first opening positioned near said top of said filter, said riser second opening positioned near said bottom of said basket exterior of said filter bag.

8. The apparatus according to claim 7 wherein said riser tube attaches to said frame.

9. A drain filter apparatus according to claim 7 where said riser second opening opens into the exterior of said basket.

10. A filter drain apparatus according to claim 7 wherein said riser first opening opens into the interior of said filter.

11. A filter drain apparatus according to claim 7 wherein said riser tube further has a means to prevent flows into said riser tube top first opening in periods of heavy flows.

12. A filter apparatus according to claim 11 wherein said means to prevent flows into the riser tube is a riser tube offset section located near said riser tube first opening.

13. A filter apparatus according to claim 12 wherein said offset section is formed by an angle in said riser tube.

14. In combination with a storm drain having an inlet and an exit, and defining a chamber therebetween, a drain filter apparatus, said apparatus comprising:
   a. a basket;
   b. a water-permeable filter positioned at least partially within said basket, said filter including a bag having an open top, a bottom and sidewalls extending between said top and said bottom, said bag having an interior and an exterior;
   c. a frame, said basket being attached to said frame; and
   d. a riser tube, said riser tube positioned in part in said basket and having an open riser top and an open riser bottom, defining a fluid conduit therebetween, said open riser top opening into the interior of said basket, said open riser bottom positioned exterior of said bag.

15. A drain filter apparatus according to claim 14 where said open riser bottom opens into the exterior of said basket.

16. A filter drain apparatus according to claim 14 wherein said open riser top opens into the interior of said filter.

17. A filter drain apparatus according to claim 14 wherein said riser tube further has a means to prevent flows into said open riser top in periods of heavy flows.

18. A filter apparatus according to claim 17 wherein said a means to prevent flows into the riser tube is an riser tube offset section located near said open riser top.

19. A filter apparatus according to claim 18 wherein said offset section is formed by an angle in said riser tube.

* * * * *